C. T. DENKER AND H. R. WINTON.
STRAINER AND FISH TRAP FOR WATER LINES.
APPLICATION FILED DEC. 3, 1919.
1,370,685.
Patented Mar. 8, 1921.
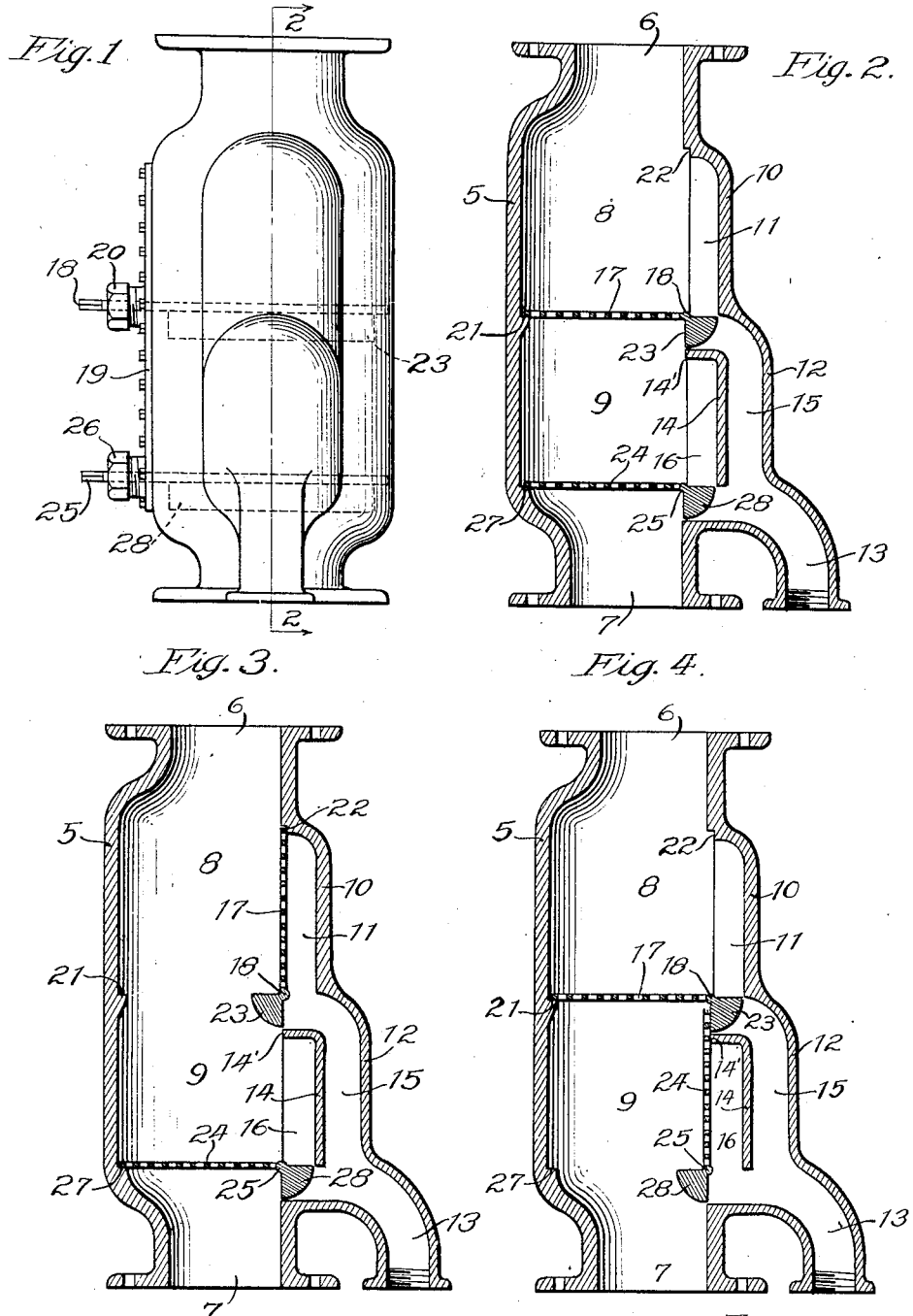

UNITED STATES PATENT OFFICE.

CHARLES T. DENKER AND HUGO R. WINTON, OF CHICAGO, ILLINOIS.

STRAINER AND FISH-TRAP FOR WATER-LINES.

1,370,685.  Specification of Letters Patent.  Patented Mar. 8, 1921.

Application filed December 3, 1919. Serial No. 342,262.

*To all whom it may concern:*

Be it known that we, CHARLES T. DENKER and HUGO R. WINTON, citizens of the United States, residing at Chicago, in the county of Cook and State of Illinois, have invented certain new and useful Improvements in Strainers and Fish-Traps for Water-Lines, of which the following is a specification.

The object of this invention is to provide a trap of simple construction for installation in a water line for the purpose of collecting fish and foreign matter which may be carried thereinto by the flow of water; and the invention has for its object more particularly the provision of such a trap which can be cleaned by water from the line without removing the trap.

And a further object of the invention is to combine and arrange two traps in a single installation so that either trap may be operatively positioned while the other trap is being cleaned, whereby the water supply may be constantly strained and the traps maintained in a clean condition.

In the accompanying drawings we have shown a selected embodiment of the invention and referring thereto—

Figure 1 is an elevation of a pipe line connection embodying the invention.

Fig. 2 is a sectional view on the line 2—2 of Fig. 1 showing both traps in operative position.

Fig. 3 is a view similar to Fig. 2 showing the primary trap in cleaning position and the secondary trap in operative position.

Fig. 4 is a view similar to Fig. 2 showing the primary trap in operative position and the secondary trap in cleaning position.

Referring to the drawings 5 designates generally the pipe connection in which the traps are embodied and which is adapted to be installed in a water line in any suitable manner. This connection has an inlet 6, an outlet 7, a primary trap chamber 8 and a secondary trap chamber 9. One wall of the connection is bulged outwardly at 10 to form a recess 11 at one side of the primary trap chamber 8, and this bulge extends outwardly to a greater extent at 12 opposite the secondary trap chamber 9 and merges into the outlet 13. A partition 14 is arranged between the bulge 12 and the secondary chamber 9 to form a passage 15 and a recess 16, the upper end of said partition being inwardly directed at 14' at the top of the recess 16 and below the primary trap chamber 8. Thus the recess 11 and the passage 15 and the outlet 13 provide a by-pass through which water from the line may be discharged without passing through the outlet 7.

A perforated strainer 17 of any suitable construction is secured to a rock shaft 18 which is mounted in opposite walls of the connection. One of these walls 19 is preferably a removable plate bolted to the connection, and the shaft 18 projects through said plate and is provided with a stuffing box 20. A ledge 21 is provided within the connection to support the free edge of the perforated strainer trap 17 when the latter is in operative position as shown in Figs. 2 and 4, and a seat 22 is provided in the opposite wall at the top of the recess 11 to receive the free edge of the strainer trap when the latter is swung up to cleaning position as shown in Fig. 3. The shaft 18 is located at the lower right-hand corner of the primary trap chamber 8, and it carries a valve 23 which, when the strainer trap is in operative position, closes communication between the primary trap chamber 8 and the adjacent part of the by-pass formed by the recess 11, and also closes communication between the secondary trap chamber 9 and the passage 15 above the partition extension 14'. This insures the flow of water through the primary strainer trap 17.

To clean the primary strainer trap 17 it is swung into engagement with the seat 22 as shown in Fig. 3. The valve 23 swings with the trap 17 and opens communication between the recess 11 and the passage 15 so that water may pass from the primary chamber 8 through the strainer trap and clean it and carry off any fish or foreign matter that may have been collected thereby through the by-pass. The space above the partition extension 14' constitutes, in effect, a chamber for the valve 23 and the construction of this valve is such that whether the strainer trap 17 is in operative or cleaning position, the valve will prevent water flowing from the secondary trap chamber through said valve chamber into the by-pass.

We may provide a connection with but only the one strainer trap, heretofore described, but we prefer to use a pair of traps so that one may always be in operative position while the other is being cleaned. For this purpose we provide another perforated strainer trap 24 which is secured to a rock shaft 25 mounted in the connection and projecting through the bolt 19 and provided with a stuffing box 26. The free edge of this trap rests on a ledge 27 when in operative position Fig. 3 and seats against the edge of the extension 14' and the valve 23 when in cleaning position, Fig. 4. A valve 28 is carried by the rock shaft 25 and operates in a chamber at the bottom of the recess 16 and formed in the wall of the connection. This valve closes communication between the secondary trap chamber 9 and the by-pass when the strainer trap 24 is in operative position Fig. 3 and opens communication with the by-pass when this strainer trap is in cleaning position Fig. 4. When it is desired to clean the secondary strainer trap 24, the screen is swung to upright position so that water may pass therethrough and through the recess 16 into the by-pass and carry with it any fish or foreign matter that may have been collected by said trap. The recess 16 constitutes a branch of the by-pass.

When the screen is disposed across the by-pass for cleaning it is in reverse position with respect to the flow of water to its position when disposed across the main passage for screening; or, to put it differently, the water flows through the screen from front to back thereof when the screen is positioned across the main passage, and from back to front thereof when the screen is positioned across the by-pass; so that all foreign material collected on the front of the screen while it is positioned across the main passage will be readily and quickly washed off by the passage of water through the screen from back to front thereof when the screen is positioned across the by-pass; and all of the water passing through the screen when it is positioned across the by-pass together with all of the foreign material washed off of the screen will be carried away through the by-pass and none of it will flow through the main passage.

Our invention provides a simple and easily operated means for trapping fish and other foreign matter in a water line and for cleaning the trap without removing it from the line. The provision of two traps as shown and described makes a very complete and satisfactory installation because one trap can always be used while the other is being cleaned. A suitable tool, will of course, be provided for operating the rock shaft, but cranks or handles may be provided for this purpose if found desirable.

We are aware that changes in the form and construction and proportion of parts of the invention may be made to suit different conditions, and we reserve the right to make all such changes as fairly fall within the scope of the following claims. The strainer traps may be made in any suitable manner and of any suitable material, and the aggregated area of the openings therein should at least equal the area of the main passage in the connection so that the flow of water through the connection will not be retarded.

I claim:

1. A water line connection having a main passage and a by-pass, and a strainer trap arranged across the main passage to strain the water passing therethrough and adapted to be swung into position across the by-pass so that water flowing from the main passage through the strainer trap will clean said trap and flow off through the by-pass.

2. A water line connection having a main passage and a by-pass, a strainer trap arranged across the main passage, a valve to close the by-pass when the strainer trap is in operative position across the main passage of the connection, and means adapted to be operated to move the strainer trap into reverse position between the main passage and the by-pass and to move the valve and open the by-pass so that water passing from the main passage through the strainer trap will clean the trap and flow off through the by-pass.

3. A water line connection having a main passage and a by-pass, a strainer trap pivotally mounted in the connection to move from operative position across the main passage to reverse cleaning position across the by-pass, and means for closing the by-pass when the strainer trap is in operative position so that all the water will flow through the main passage and screen and for opening the by-pass when the strainer trap is in cleaning position so that the water flowing through the screening will flow off through the by-pass.

4. A water line connection having a main passage and a by-pass, a rock shaft mounted in the connection, a strainer trap, and a valve carried by said rock shaft and adapted to be moved thereby to close the by-pass when the strainer is in operative position across the main passage and to open the by-pass when the strainer trap is in reverse cleaning position between the main passage and the by-pass.

5. A water line connection having a main passage and a by-pass, a valve normally closing the by-pass, a strainer trap arranged in operative position across the main passage, and means for moving the strainer trap into reverse cleaning position between the main passage and the by-pass and leaving the main passage unobstructed and at the same time for moving the valve to open the by-pass so that the water flowing through the screen will flow off through the by-pass.

6. A water line connection having a main passage and a by-pass, a pair of strainer traps one in advance of the other in said connection and adapted to be arranged in operative position across the main passage and in cleaning position between the main passage and the by-pass, and means associated with each trap for closing communication between the main passage and the by-pass when the trap is in operative position and for opening communication between the main passage and the by-pass when the trap is in cleaning position.

7. A water line connection having a main passage and a by-pass, a pair of rock shafts mounted one in advance of the other in said connection, a strainer trap mounted on each of said shafts and adapted to be arranged in operative position across the main passage and in cleaning position between the main passage and the by-pass and a valve carried by each shaft and closing communication between the main passage and the by-pass while its associated trap is in operative position and opening communication between the main passage and the by-pass when the strainer trap is in cleaning position.

8. A water line connection having a main passage and a by-pass, and a strainer arranged across the main passage to strain the water passing therethrough in one direction and adapted to be swung into reverse position between the main passage and the by-pass and substantially perpendicular to its normal position across the main passage so that water may flow from the main passage into the by-pass through the strainer in the opposite direction to clean said strainer.

CHARLES T. DENKER.
HUGO R. WINTON.

Witnesses:
 WM. O. BELT,
 M. A. KIDDIE.